2 Sheets—Sheet 2.
D. McVAW.
PLOWING AND SEEDING MACHINE.
No. 170,754. Patented Dec. 7, 1875.
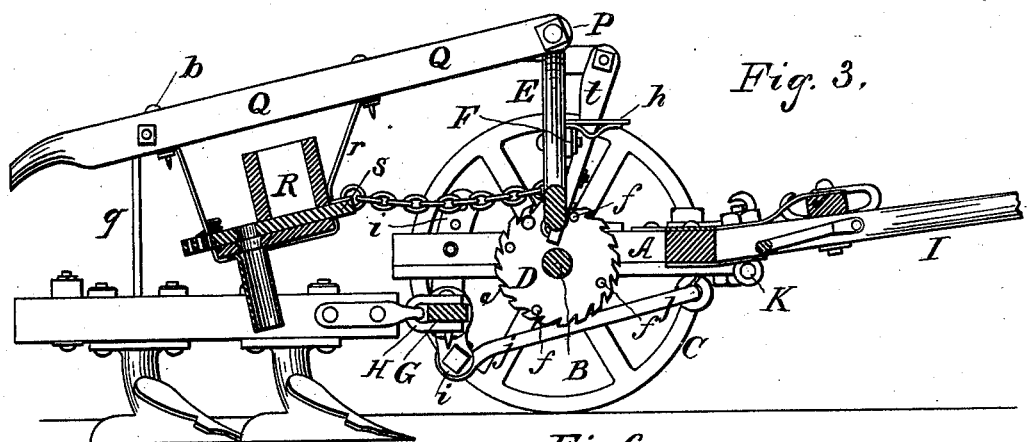
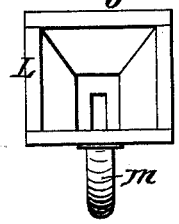
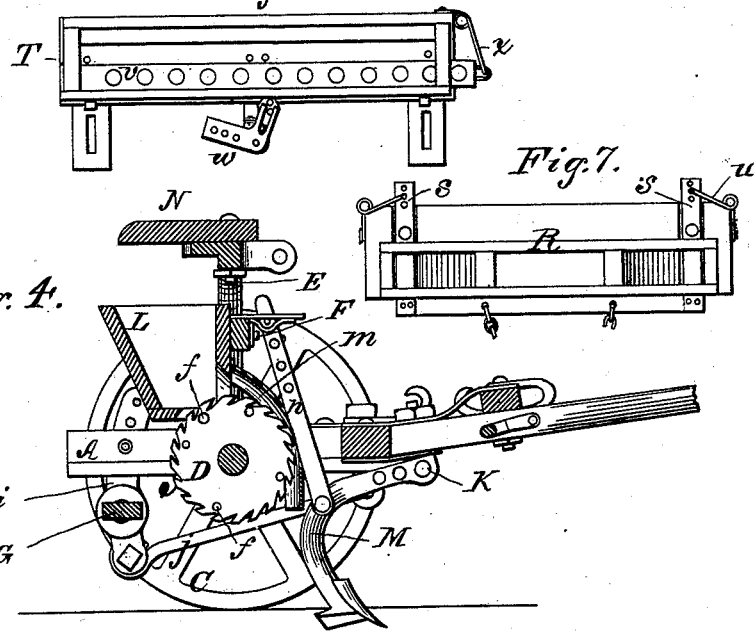
Witnesses:
Donn Twitchell
Hall W. Dodge
Inventor:
Daniel McVaw
By his attys
Dodge & Son

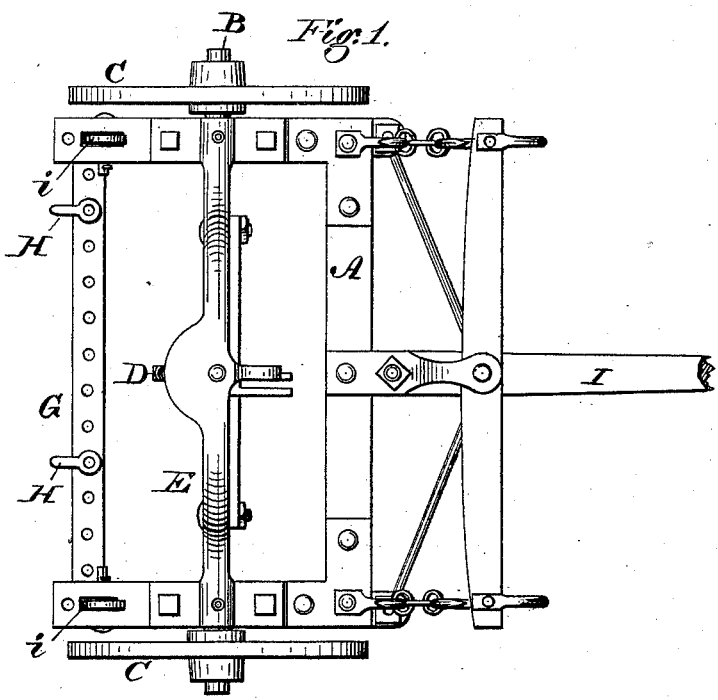

UNITED STATES PATENT OFFICE.

DANIEL McVAW, OF GALLATIN, TENNESSEE.

IMPROVEMENT IN PLOWING AND SEEDING MACHINES.

Specification forming part of Letters Patent No. 170,754, dated December 7, 1875; application filed July 3, 1875.

*To all whom it may concern:*

Be it known that I, DANIEL McVAW, of Gallatin, in the county of Sumner and State of Tennessee, have invented certain Improvements in Combination Machine for Seeding and Plowing, of which the following is a specification:

My invention consists in a frame constructed in a peculiar manner, and provided with certain devices by which it is adapted for receiving and operating various attachments, by which the machine is adapted at will for plowing, planting corn or cotton, drilling wheat, and performing various other similar operations.

Figure 1 represents a top-plan view of the frame; Fig. 2, a longitudinal central section of the same; Fig. 3, a sectional view of the frame with the corn-planting devices attached; Fig. 4, a view of the same with the cotton-seed-planting devices attached; Figs. 5, 6, and 7, plan views of the cotton-seed, wheat, and corn hoppers, respectively.

A represents the frame of my machine, consisting of two side bars united rigidly at their forward ends by a cross-bar. B is a transverse axle or shaft, having its ends journaled in boxes on the under side of the frame. C C are two driving-wheels, in which the ends of the shaft B are mounted, one of the wheels being either fastened upon the shaft or provided with devices for driving the same. D is a wheel, secured on the middle of the shaft or axle, having hooked teeth $e$ to feed the cotton-seed, and a lateral pin or pins, $f$, to actuate the mechanism for dropping corn and wheat, as hereinafter described. E is an arched bar, extending across the frame, and secured rigidly thereto at its ends, as shown, for the purpose of supporting the operator's seat and the forward ends of the handles, by which the plows are controlled and the seed-hoppers supported. F is a cross-bar, secured to the arched bar, and provided at the middle with an arm, $h$, to sustain a link controlling a plow which opens the furrow for the cotton-seed. G is a rear cross-bar, provided with numerous holes, and journaled at its ends in the lower ends of two curved bars, $i$, which have their upper ends passed through the frame, and their lower ends held and braced by rods $j$, extending to the forward end of the frame, as shown, the bars $i$ being curved in the arc of a circle struck from the forward ends of the rods $j$, and being provided with a series of holes to receive sustaining-pins $k$, which are passed through above the frame, as shown. H are clevises, attached to and adjustable upon the transverse bar G, for the purpose of drawing the plows. I represents a draft-pole or tongue, attached rigidly to the front of the frame. K is an eyebolt in the middle of the frame at its front, to receive the beam of a plow for opening the cotton-seed furrow.

When the machine is to be used for planting cotton-seed, I secure by a bolt to the rear side of the cross-bar F a hopper, L, having in its bottom a slot to receive the upper edge of the wheel D, and having also on the front side a shield or cap, $m$, which fits over the front edge of the wheel to retain the seed thereon, and direct it toward the furrow as it is released. I also attach to the eyebolt K the beam of a single-shovel plow, M, having attached to its rear end a link, $n$, the upper end of which I secure in the arm on cross-bar F by means of a pin, as shown in Fig. 4, the bar being provided with a series of the pin-holes, as shown, so that the plow may be caused to enter the ground to a greater or less depth, as circumstances may render advisable. I also mount on the middle of the arch E a seat, N, for the operator, as shown, securing the same in place by a bolt. When the parts are thus arranged, and the machine drawn forward, a furrow will be opened by the plow M, and the seed carried forward and discharged into the furrow by the teeth on the edge of the wheel D.

When the machine is to be employed as a corn-planter, I attach to the cross-bar G two plows to open the furrows, and pivot upon the arched bar F a bar, P, on the ends of which I mount the forward ends of two handles Q, which have their rear ends connected by a cross-bar, $b$, and supported by two rods, $q$, which extend downward from the bar $p$ to the plow-beams, as shown in Fig. 3. I next provide a hopper, R, such as represented in Fig. 7, and suspend the same by straps or stirrups $r$ from the handles Q, as shown in Fig. 3. The hopper is provided at each end with a transverse feed-slide, s, and a depending tube to direct the corn into the furrow. The two slides s are connected by a cross-bar, which is connected by chains to the lower end of an arm, t, which I pivot at its upper end to the arched bar E, as shown in Fig. 3. The pins on the side of the wheel act upon the arm t, and cause the same to draw the feed-slides forward, while springs u, attached to the ends of the hopper, draw them backward again when the arm is released.

The distances between the hills may be varied by changing the number of pins on the wheel, the latter being provided with a series of holes to permit the application of any desired number of pins.

When the machine is to be employed for drilling wheat, a driver's seat is mounted upon the arched bar, as when planting cotton, the required number of beams with hoes or drill-teeth attached to the cross-bar G, and a hopper, T, such as represented in Fig. 6, attached by means of arms on its ends, and bolts passed through the same to the rear end of the main frame. The hopper-bottom is perforated and provided with a longitudinal perforated feed-slide, v, to which there are connected an elbow-lever, w, for moving it forward, and a spring, x, for drawing it backward, as shown in Fig. 6. The lever w is connected by a rod or chain with the depending arm t, actuated by the pins on the wheel, in the same manner as in the corn-planter.

When the machine is to be used as a gang-plow, the driver's seat is mounted on the arched bar, and the desired number of plows attached to the rear cross-bar, and united at their rear ends by a second cross-bar.

When driving to and from the field, the plows may be turned up and rested against the arched bar. The number, form, and size of the plows used depend, of course, upon the nature of the work to be performed, and upon the strength of the team employed.

By the use of my frame and its attachments I provide a single machine which will perform all the various operations of tilling the soil and cultivating the different crops, thus enabling the farmer to avoid much of the expense and the room incident to the use of the separate machines for the different purposes.

Having described my invention, what I claim is—

1. The frame A, provided with the axle B, wheels C, wheel D, arched bar E, and adjustable transverse bar G, in combination, as shown.

2. The wheel D, provided with the teeth for feeding cotton-seed, and the lateral pins for operating the wheat and corn dropping mechanism.

DANIEL McVAW.

Witnesses:
 JOHN F. WHITE,
 GEORGE E. SEVY.